US012754299B2

(12) United States Patent
Sergeev

(10) Patent No.: US 12,754,299 B2
(45) Date of Patent: Oct. 6, 2026

(54) VERIFICATION OF THE OPERABILITY OF A LASER SCANNER

(71) Applicant: Valeo Schalter und Sensoren GmbH, Bietigheim-Bissingen (DE)

(72) Inventor: Nikolai Sergeev, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 722 days.

(21) Appl. No.: 18/036,495

(22) PCT Filed: Nov. 8, 2021

(86) PCT No.: PCT/EP2021/080908
§ 371 (c)(1),
(2) Date: May 11, 2023

(87) PCT Pub. No.: WO2022/101128
PCT Pub. Date: May 19, 2022

(65) Prior Publication Data

US 2023/0408657 A1 Dec. 21, 2023

(30) Foreign Application Priority Data

Nov. 11, 2020 (DE) ..................... 10 2020 129 662.2

(51) Int. Cl.
*G01C 3/08* (2006.01)
*G01S 7/497* (2006.01)
(Continued)

(52) U.S. Cl.
CPC .............. *G01S 7/497* (2013.01); *G01S 17/08* (2013.01); *G01S 17/931* (2020.01)

(58) Field of Classification Search
CPC ......... G01S 7/497; G01S 17/931; G01S 17/08
See application file for complete search history.

(56) References Cited

U.S. PATENT DOCUMENTS

2018/0189977 A1* 7/2018 Zecchini ................. G01S 17/10

FOREIGN PATENT DOCUMENTS

DE 102013205312 A1 10/2014
DE 102018110566 A1 * 11/2019 ............. G01S 17/42
JP 2016033482 A * 3/2016 ............. G01S 17/42

OTHER PUBLICATIONS

International Search Report and Written Opinion in corresponding International Application No. PCT/EP2021/080908, dated Feb. 24, 2022 (12 pages).

(Continued)

*Primary Examiner* — Mark Hellner
(74) *Attorney, Agent, or Firm* — Osha Bergman Watanabe & Burton LLP

(57) ABSTRACT

According to a method for verifying the functionality of a laser scanner (2*b*) comprising a housing (4) with a light-permeable window (5), a transmission unit (6) inside the housing (4), a deflection unit (10), and a detector unit (7) inside the housing (4), at least one test signal (15) is transmitted by the transmission unit (6) during a test phase. The deflection unit (10) is oriented in such a way that the at least one test signal (15) is not directed to the window (5). Components of the at least one test signal are detected by the detector unit, and based on said detection, at least two detector signals are generated. A computing unit ascertains a pulse width for each of the detector signals and calculates a sum of the pulse widths. The operability of the transmission unit and/or the detector unit is verified on the basis of said sum.

12 Claims, 3 Drawing Sheets

(51) Int. Cl.
*G01S 17/08* (2006.01)
*G01S 17/931* (2020.01)

(56) References Cited

OTHER PUBLICATIONS

German Search Report in corresponding German Application No. 10 2020 129 662.2, dated Aug. 30, 2021 (5 pages).

* cited by examiner

VERIFICATION OF THE OPERABILITY OF A LASER SCANNER

BACKGROUND

The present invention relates to a method for checking the function of a laser scanner, which a housing with a light-transmissive window, a transmitter unit for emitting laser signals which is arranged within the housing, a movable deflection unit for deflecting the laser signals, and a detector unit arranged within the housing, wherein at least one test signal is transmitted by means of the transmitter unit during a test phase, the deflection unit is aligned vis-à-vis the transmitter unit during the test phase so that the at least one test signal is not directed at the window. The invention also relates to a corresponding laser scanner device having a computing unit and a laser scanner, a motor vehicle having a laser scanner device, and a computer program product.

Lidar systems may be fitted on motor vehicles in order to realize various functions of electronic vehicle guidance systems or driver assistance systems. These functions include distance measurements, distance control algorithms, lane keeping assistants, object tracking functions, and so on.

A known design of lidar systems are so-called laser scanners, in which a laser beam is deflected by means of a deflection unit, with the result that different deflection angles of the laser scanner can be realized. The emitted laser beams can be partially reflected or scattered in the surround, and scattered or reflected components can in turn partly impinge on the laser scanner, in particular on a detector unit of the laser scanner, which can generate corresponding detector signals on the basis of the detected components. The transmitter unit of a laser scanner contains one or more laser light sources and the detector unit contains one or more optical detectors, for example photodiodes.

The maximum range of the laser scanner is of great importance, in principle and especially in the automotive context. The functionality and in particular the maximum range of a laser scanner can be caused, for example, by the contamination of the light sources or optical detectors. For example, the contamination can be traced back to dust particles that arise during the manufacturing process. Such dust particles can partially cover the light source or the optical detector and thus reduce the range of the laser scanner. In principle, contaminations can be identified by tests at the end of the manufacturing process, for example. However, it is possible that the contaminations only arise after the test or that contaminations already present before the test only cover the light source or the optical detector after the test.

Document DE 10 2018 110 568 A1 describes a method for checking the functionality of a laser scanner. In this case, a light signal is transmitted by means of a transmitter of the laser scanner, while a rotatable or pivotable deflection mirror unit is aligned in such a way that light signals coming from the transmitter cannot be directed at a window as the housing of the laser scanner. The light signal scattered within the housing is received by the receiver and compared to a reference intensity distribution. Depending on a result of the comparison, a notification regarding the functionality of the laser scanner is optionally generated.

A disadvantage of this method is that the reference intensity distribution is generally temperature-dependent, with the result that different reference intensity distributions have to be stored for different temperatures.

DETAILED DESCRIPTION

Figure 1:
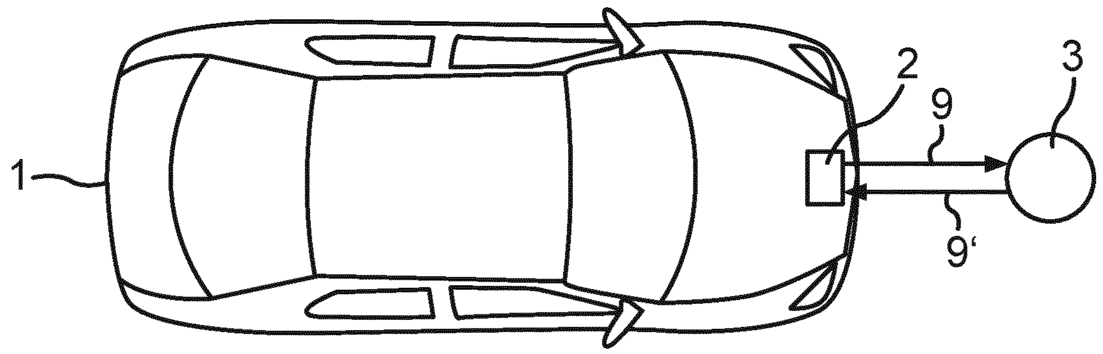
FIG. 1 shows a schematic illustration of a motor vehicle with an exemplary embodiment of a laser scanner device according to the improved concept.

Against this background, it is an object of the present invention to specify an improved concept for checking the function of a laser scanner, which is more robust with respect to temperature fluctuations.

This object is achieved by the respective subject matter of the independent claims. Advantageous developments and preferred embodiments are the subject matter of the dependent claims.

The improved concept is based on the idea of determining a pulse width for each corresponding detector signal in a laser scanner whose detector unit contains at least two optical detectors, and of determining the sum of the pulse widths in order to check the functionality.

According to the improved concept, a method for checking the function of a laser scanner is specified. The laser scanner has a housing with a light-transmissive window and a sensor for emitting laser signals which is arranged within the housing. The laser scanner also has a movable deflection unit for deflecting the laser signals and a detector unit which is arranged within the housing and has at least two optical detectors. According to the method, at least one test signal is transmitted by means of the transmitter unit during a test phase. During the test phase, the deflection unit is aligned vis-à-vis the transmitter unit, in particular by means of a control unit of the laser scanner, so that the at least one test signal is not directed at the window, especially by means of the deflection unit. Components of the at least one test signal, in particular reflected and/or scattered components, are recorded by means of the at least two optical detectors and at least two detector signals are generated by the at least two optical detectors on the basis of the recorded components. A pulse width is determined by means of a computing unit, in particular by means of a computing unit of the laser scanner or by means of a computing unit coupled to the laser scanner, for each of the at least two detector signals and a sum of the determined pulse widths, in particular of all determined pulse widths, is calculated. A functionality of the transmitter unit and/or detector unit is checked, in particular by means of the computing unit, on the basis of the sum.

Here and below, the term "light" may be understood as comprising electromagnetic waves in the visible range, in the infrared range, and/or in the ultraviolet range. Accordingly, the term "optical" may also be understood as relating to light in this sense. The laser signals and the test signal preferably correspond to light in the infrared range.

The light-transmissive window of the housing is, in particular, light-transmissive for light that can be emitted by means of the transmitter unit, in particular in the form of the laser signals or the test signal. Apart from the window, the housing can be opaque, for example.

The laser signals and the at least one test signal each correspond to laser signals that can be emitted by means of one or more light sources of the transmitter unit, in particular laser light sources, for example laser diodes. In particular, the at least one test signal can be viewed as a special case of the laser signals, specifically as a laser signal of the kind emitted during the test phase. Nevertheless, the test signals can also be generated and emitted with a specially adapted spectral composition or structure or any other composition or structure, which may differ from other laser signals that are generated and emitted outside of the test phase. This is not mandatory, however.

The detector unit, in particular the at least two optical detectors, is or are configured to detect reflected or scattered components of the laser signals and of the at least one test signal. If the laser signals are emitted through the light-transmissive window into the surround of the housing, then components of the laser signal that are reflected or scattered outside the laser scanner or housing, for example, can re-enter the housing and can subsequently be detected. In the case of the at least one test signal, components of the at least one test signal possibly reflected and/or scattered multiple times within the housing, in particular, are detected by the at least two optical detectors. In particular, the at least one test signal essentially does not leave the housing of the laser scanner as a result of not being directed at the window.

The at least one test signal not being directed at the window can be understood in particular on the basis of a ray-optical understanding or an understanding in keeping with geometric optics.

Each optical detector of the at least two optical detectors generates, in particular, an associated detector signal of the at least two detector signals on the basis of the components recorded by the respective optical detector. Depending on the specific embodiment of the laser scanner, the at least two optical detectors can be configured differently. The at least two optical detectors preferably each contain a photodiode, for example an avalanche photodiode, APD. The time profile of one of the detector signals therefore reflects the time profile of the number of photons that impinge on a corresponding optically active surface of the respective optical detector.

In particular, the detector signals have signal pulses, which can also be referred to as echoes. The pulse width of a detector signal therefore corresponds in particular to a pulse width of a corresponding signal pulse. In this case, the pulse width is given by a period of time during which the amplitude of the corresponding detector signal assumes a value above a predefined limit value. This pulse width is also referred to as the echo pulse width, EPW.

Checking the functionality of the transmitter unit and/or detector unit can be understood in particular in the context of the sum of the pulse widths being used to check whether there is a limitation in comparison with a normal operation or an unlimited operation or an unlimited function of the transmitter unit and/or detector unit.

In particular, the number of photons impinging on the active surface of an optical detector affects the pulse shape of the corresponding signal pulse and thus affects the pulse width. If the pulse width under reproducible conditions, as are given during the test phase, therefore differs from what is expected for regular or unlimited operation, it is possible to deduce that the transmitter unit and/or the detector unit has a limited functionality. This may be caused, in particular, by the partial or complete coverage of a light source of the transmitter unit or of one of the optical detectors, that is to say, in particular, an active surface of one of the optical detectors.

The improved concept makes use of the discovery that the sum of the pulse widths, in particular for a predefined detector sensitivity of the entire detector unit, is at least approximately invariant vis-à-vis temperature fluctuations, even if the individual optical detectors have temperature characteristics that deviate from one another, for example if the relationship between temperature and voltage, in particular reverse voltage, with which the optical detector has to be operated in order to obtain a certain sensitivity, is not exactly the same for all optical detectors. By way of example, such different temperature characteristics may be traced back to slightly different sizes of the respective active surfaces of the optical detectors. Then, the individual pulse widths may by all means change in the case of temperature fluctuations, but the sum of all pulse widths remains at least approximately constant since a possibly smaller pulse width of one of the detectors is compensated for by correspondingly larger pulse widths of the remaining detectors. It was found that this still is the case even when one of the at least two optical detectors deviates significantly from the remaining optical detectors in terms of its temperature characteristic. If the calculated sum of the pulse widths now deviates from an expected value, which may for example be determined within the scope of a calibration, then this indicates a restricted function of one of the optical detectors or of a light source of the transmitter unit, for example on account of contamination. Moreover, the size of the deviation of the value of the sum from the value to be expected in the case of an unlimited function can allow a statement to be made as to how severe the functional limitation or the contamination is. The greater the coverage, the fewer photons are detected by the corresponding optical detector and the smaller the pulse width becomes, which results in a correspondingly greater deviation of the sum as a consequence.

Additionally, a possible influence of ambient light is reduced or virtually excluded as a result of using the test signals in the manner described.

According to at least one embodiment of the method according to the improved concept, the sum is compared with a given reference value by means of the computing unit, and the functionality of the transmitter unit and/or detector unit is checked on the basis of a result of the comparison.

In this case, the reference value can be, in particular, the sum of the pulse widths at an earlier time, for example during the calibration. Deviations of the sum from the reference value, in particular those deviations which exceed a predefined tolerance value, indicate the restricted functionality of the at least two optical detectors or of a light source.

In various embodiments, the reference value can also be updated or updated periodically, for example when the laser scanner is activated or deactivated. If, in particular, no significant impairment of the functionality of the transmitter unit and/or detector unit is determined, then the calculated sum of the pulse widths can be defined and stored as a new reference value. This allows effects caused by regular aging of the components, in particular of the optical detectors, to be compensated for.

According to at least one embodiment, the at least two optical detectors each contain a photodiode, for example an avalanche photodiode, APD, operated in the reverse direction, especially by means of a control unit of the laser scanner. A reverse voltage for operating the photodiodes is controlled during the test phase, in particular by means of the control unit, in order to set, and in particular keep constant, a predefined detector sensitivity of the detector unit.

The detector sensitivity is in particular a joint sensitivity of all optical detectors of the at least two optical detectors. By way of example, the said sensitivity may be determinable by way of an overall dark current of the at least two optical detectors and/or, especially in the case of APDs, a joint multiplication factor of the at least two optical detectors. In this context, the multiplication factor specifies, in particular, the number of charge carriers generated per detected photon, for example on average, by means of the at least two optical detectors.

In this case, the at least two optical detectors are all operated with the same reverse voltage in particular.

According to at least one embodiment, a setpoint value for the closed-loop control of the reverse voltage is determined dependent on the detector sensitivity on the basis of given calibration data, in particular by means of the control unit.

By way of example, the calibration data may describe a relationship between a temperature, for example an ambient temperature of the at least two optical detectors or a heat sink temperature of the at least two optical detectors or the like, and the reverse voltage required to obtain the detector sensitivity. In particular, this relationship may be at least approximately linear. The relationship may be stored in a storage element of the computing unit or control unit, for example stored in the form of a conversion table or lookup table.

For calibration purposes, the detector sensitivity or a corresponding dark current or a corresponding multiplication factor, for example, may be specified. Then, the corresponding reverse voltage required to obtain the detector sensitivity or the dark current or the multiplication factor can be determined for two or more temperatures. Reverse voltages for further temperatures can then be determined by linear interpolation and/or extrapolation.

According to the improved concept, a laser scanner device having a computing unit and a laser scanner is also specified. The laser scanner has a housing with a light-transmissive window and a transmitter unit for emitting laser signals which is arranged within the housing. The laser scanner has a control unit and a movable deflection unit for deflecting the laser signals, and a detector unit which is arranged within the housing and has two or more optical detectors. The control unit is configured to drive the transmitter unit to transmit at least one test signal during a test phase. The control unit is also configured to drive the deflection unit in such a way that the deflection unit is aligned vis-à-vis the transmitter unit during the test phase so that the at least one test signal is not directed at the window. The at least two optical detectors are configured to record reflected and/or scattered components of the at least one test signal and to generate at least two detector signals on the basis of the detected components. The computing unit is configured to determine a pulse width for each of the at least two detector signals and to calculate a sum of the pulse widths. The computing unit is configured to check a functionality of the transmitter unit and/or detector unit on the basis of the sum.

The computing unit can be part of the laser scanner in this case, or be provided separately therefrom. If the laser scanner device is provided for use in or on a motor vehicle, then the computing unit can be implemented, for example, as an electronic controller of the motor vehicle. The control unit can optionally also be part of the computing unit. In particular, described functions or tasks of the computing unit can be performed by the control unit in various embodiments, or vice versa.

According to at least one embodiment of the laser scanner device, the deflection unit contains a rotatable or pivotable mirror or a microelectromechanical mirror system, that is to say a mirror which is designed as a microelectromechanical system, MEMS.

In particular, the control unit can drive the deflection unit during the test phase in such a way that test signals correspondingly emitted by the transmitter unit either do not impinge on a reflective surface of the deflection unit, in particular of the mirror, or are deflected by the reflective surface into a region within the housing that does not correspond to the window.

In various embodiments, the pivotable or rotatable mirror contains a mirror body, which in particular can have a substantially cuboid form, with a reflective surface being located on one side face of the cuboid. In various configurations, a further reflective surface can be arranged on a side of the cuboid opposite to the reflective surface. The mirror body is mounted so as to be rotatable or pivotable about an axis of rotation, which in particular passes through two further opposite side faces of the cuboid. The two remaining side faces of the cuboid, which therefore correspond neither to a reflective surface nor to a side face through which the axis of rotation passes, can be referred to as end faces, for example.

In various embodiments, the control unit is configured to drive the deflection unit during the test phase in such a way that the emitted test signals impinge on one of the end faces.

According to at least one embodiment, the at least two optical detectors each contain a photodiode, in particular an APD. The control unit is configured to operate the photodiodes in the reverse direction and to control a reverse voltage for operating the photodiodes during the test phase in order to set a predefined detector sensitivity of the detector unit.

According to at least one embodiment, the control unit is configured to operate all photodiodes of the at least two optical detectors using the same controlled reverse voltage in each case during the test phase.

According to at least one embodiment, the control unit is configured to determine a setpoint value for the closed-loop control of the reverse voltage dependent on the detector sensitivity on the basis of given calibration data.

Further embodiments of the laser scanner device follow directly from the different configurations of the method according to the improved concept, and vice versa. In particular, a laser scanner device according to the improved concept may be configured or programmed to carry out a method according to the improved concept, or the laser scanner device carries out such a method.

According to the improved concept, a motor vehicle containing an embodiment of a laser scanner device according to the improved concept is also specified.

A computer program having instructions is also specified according to the improved concept. When the instructions or the computer program are executed by a laser scanner device according to the improved concept, the instructions cause the laser scanner device to carry out a method according to the improved concept.

According to the improved concept, a computer-readable storage medium which stores a computer program according to the improved concept is also specified.

Computer programs and computer-readable storage media according to the improved concept can be referred to as respective computer program products with the instructions.

Further features of the invention are evident from the claims, the figures, and the description of the figures. The features and combinations of features mentioned above in the description and the features and combinations of features mentioned below in the description of the figures and/or shown in the figures alone can be included in the improved concept not only in the combination specified in each case, but also in other combinations. Thus, those embodiments of the improved concept which are not explicitly shown and/or explained in the figures, but emerge and can be produced from the explained embodiments by virtue of separate combinations of features, are also included and disclosed. Thus, in particular, embodiments and combinations of features which do not have all the features of an originally worded claim are also included and disclosed. Furthermore, embodiments and combinations of features which go beyond or differ from the combinations of features set out in the back-references of the claims are included and disclosed.

FIG. 1 schematically depicts an exemplary embodiment of a motor vehicle 1 according to the improved concept. The motor vehicle 1 contains a laser scanner device 2 according to an exemplary embodiment according to the improved concept. The laser scanner device 2 can emit laser signals 9 into a surround of the motor vehicle 1 and detect components 9' of the laser signals reflected by an object 3 in the surround. The laser scanner device 2 can determine a position and/or distance of the object 3 from the laser scanner device 2 on the basis of the detected reflected components 9'. This can be implemented, for example, on the basis of the concept of the time-of-flight (TOF) measurement.

Figure 2:
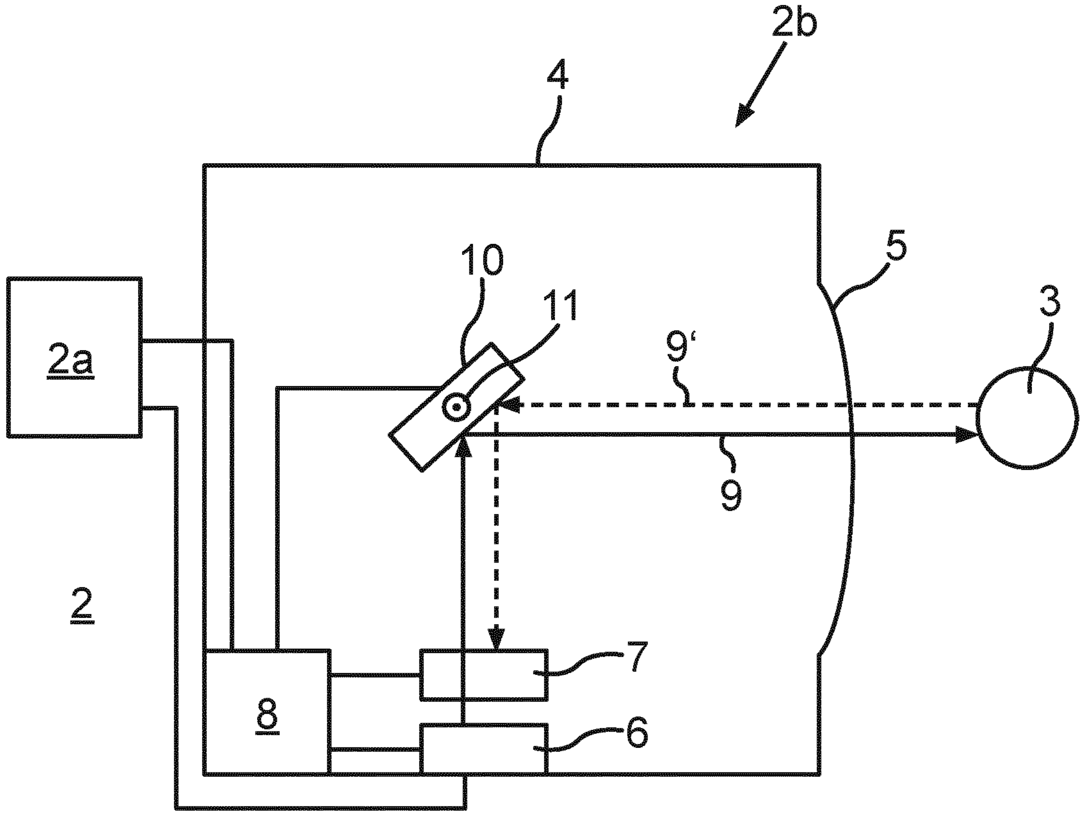
FIG. 2 shows a schematic illustration of a further exemplary embodiment of a laser scanner device according to the improved concept.

FIG. 2 schematically shows a block diagram of an exemplary embodiment of a laser scanner device 2, for example the laser scanner device 2 of the motor vehicle 1 from FIG. 1. The laser scanner device 2 has a laser scanner **2*b* and a computing unit 2*a* which is connected to the laser scanner 2*b* and which can be in the form of an electronic controller of the motor vehicle 1, for example. The laser scanner 2*b* has a housing 4 with a light-transmissive window 5 and a transmitter unit 6 for emitting the laser signals 9 which is arranged within the housing 4, said laser signals being emitted through the light-transmissive window 5. The laser scanner 2*b* contains a control unit 8, which is connected to the computing unit 2*a* and to the transmitter unit 6 in order to drive the latter in order to emit the laser signals 9. The laser scanner 2*b* also contains a detector unit 7 with at least two optical detectors, which are designed in particular as photodiodes, for example as APDs. The transmitter unit 6** contains at least one light source, in particular a laser source, for example at least one infrared laser diode.

The detector unit 7 can detect the reflected components 9' of the laser signals 9, and on the basis thereof each of the at least two optical detectors can generate a corresponding detector signal and transmit the latter to the control unit 8 and/or the computing unit **2*a***.

The laser scanner **2*b* also contains a deflection unit which can have, for example, a mirror 10 rotatably mounted about an axis of rotation 11. In FIG. 2, the axis of rotation 11 is perpendicular to the plane of the drawing. The deflection unit is likewise connected to the control unit 8 and the control unit 8 can accordingly drive the deflection unit so that the mirror 10 is rotated about the axis of rotation 11. The emission angle of the laser signals 9 can thus be varied by the rotation of the mirror 10. A reception path for the reflected components 9' of the laser signals 9 reflected by the object 3, for example, leads via the mirror 10 to the detector unit 7, in particular to an active surface of one of the optical detectors. The reflected components 9' are then recorded by the corresponding optical detector, and so, by rotating the mirror 10 about the axis of rotation 11, each of the optical detectors can detect reflected components 9', incident from different directions, of the laser signals 9. The instantaneous position of the mirror 10 can be determined, for example, via a rotary encoder (not shown) coupled to the axis of rotation 11** or a corresponding shaft.

Since the instantaneous position of the mirror 10 is known for example at every point in time, a set of scanning points, which is also referred to as point cloud, can be generated by way of the temporal sequence of the detected reflected components 9'. In this case, a subset of the scanning points or point cloud is generated by means of each optical detector. A subset of scanning points generated by means of one of the optical detectors can also be referred to as the location of scanning points.

Figure 3:
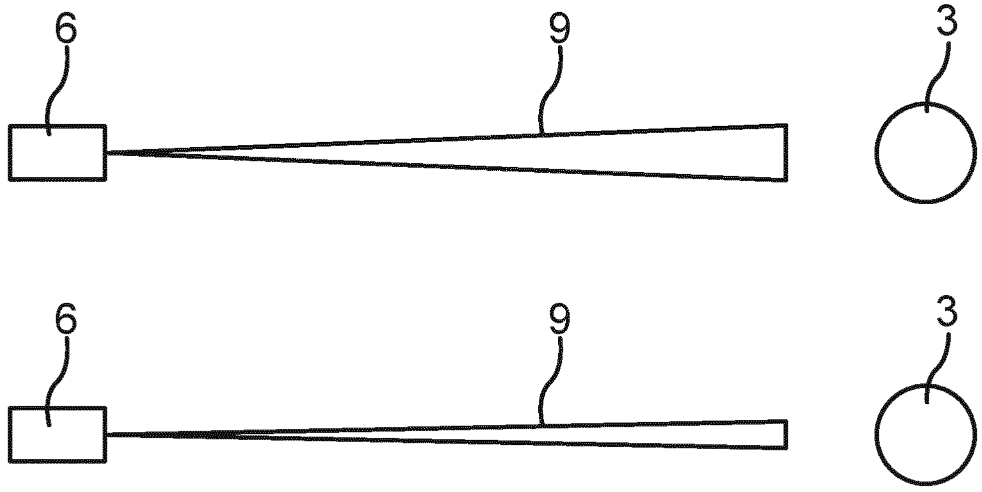
FIG. 3 shows schematic illustrations of a transmitter unit of a further exemplary embodiment of a laser scanner device according to the improved concept.

FIG. 3 schematically shows the transmitter unit 6 of the laser scanner **2*b* from FIG. 2, and also the laser signals 9 and the object 3. The upper illustration in FIG. 3 corresponds, for example, to a side view, that is to say a view looking in the direction perpendicular to the axis of rotation of the mirror 10. The lower illustration in FIG. 3 corresponds, for example, to a plan view of the transmitter unit 6, that is to say a view looking in the direction parallel to the axis of rotation of the mirror 10. As is evident from the illustrations in FIG. 3, a respective beam expansion of the laser signals 9** can be different in different planes.

FIG. 4 once again schematically depicts the detector unit 7 and the mirror 10 of the laser scanner **2*b* of FIG. 2, with the reception path of the reflected components 9' being indicated. Optionally, the laser scanner 2*b* can have a lens arrangement 14 for beam guidance arranged in the reception path for the reflected components 9'**.

Figure 4:
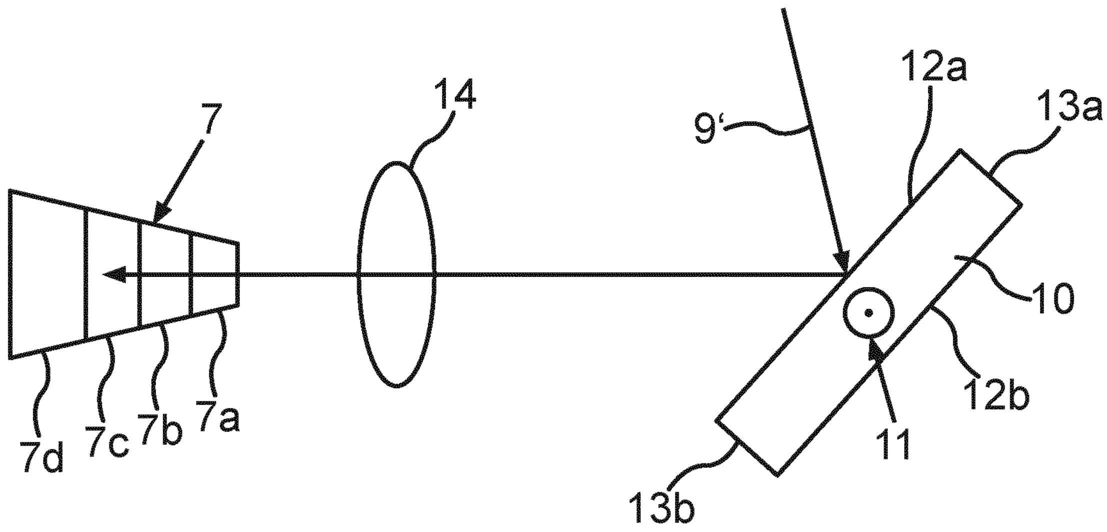
FIG. 4 schematically shows a part of a further exemplary embodiment of a laser scanner device according to the improved concept in a scanning phase.

The example of FIG. 4 depicts four optical detectors **7*a*, 7*b*, 7*c*, 7*d* of the detector unit 7, which are arranged linearly next to one another, for example. By way of example, the transmitter unit 6 can have two or more light sources, with each light source being assigned two or more of the optical detectors 7*a*, 7*b*, 7*c*, 7*d***.

In FIG. 4, the mirror 10 has an approximately or substantially cuboid mirror body. However, the side faces of the mirror body need not necessarily be planes but can also be curved, for example. The mirror 10 has, for example, two opposite reflective sides **12*a*, 12*b* arranged parallel to the axis of rotation 11. Two non-reflective end faces 13*a*, 13*b* of the mirror body are arranged perpendicularly to the reflective sides 12*a*, 12*b* and likewise parallel to the axis of rotation 11**.

In FIG. 4, the laser scanner **2*b* is depicted during a scanning phase, for example. The transmitter unit 6 emits the laser signals 9 which are incident on one of the reflective surfaces 12*a*, 12*b* and, as also depicted schematically in FIG. 2, are steered to the window 5 by the deflection unit such that said laser signals can leave the housing 4. The reflected components 9' are likewise incident on the reflective surface 12*a*, 12*b* and are accordingly deflected to the detector unit 7**.

Figure 5:
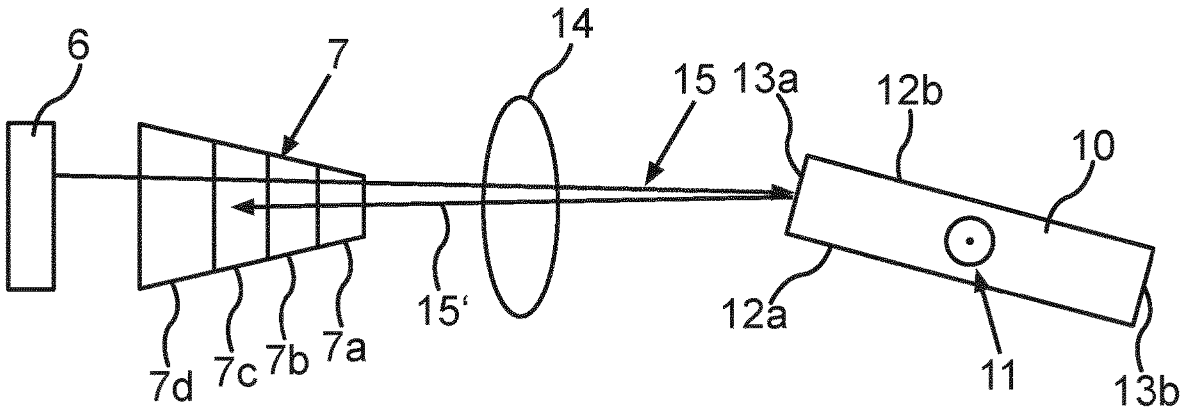
FIG. 5 shows a schematic illustration of a further exemplary embodiment of a laser scanner device according to the improved concept in a test phase.

In FIG. 5, the laser scanner **2*b* is depicted during a test phase. During the test phase, the mirror 10 is aligned vis-à-vis the transmitter unit 6 in such a way that the test signals 15 emitted during the test phase are incident on one of the end faces 13*a*, 13*b* and are accordingly not steered in the direction of the window 5 but instead are reflected or scattered multiple times within the housing 4. The components 15' of the test signal 15 which are accordingly reflected and scattered multiple times are incident in turn on the active surfaces of the optical detectors 7***a*, 7*b*, 7*c*, 7*d*, which generate corresponding detector signals on the basis thereof and transmit said detector signals to the computing unit. The computing unit 2*a* then determines a corresponding pulse width, which can also be referred to as the echo pulse width, EPW, for each of the detector signals.

The computing unit 2*a* moreover determines a sum of all determined pulse widths and compares the sum with a specified reference value, which for example was determined within the scope of a calibration of the laser scanner 2*b*. If the sum deviates from the reference value by more than a given tolerance value, it is possible to deduce that the functionality of one of the optical detectors 7*a*, 7*b*, 7*c*, 7*d* or of one of the light sources is restricted, for example by corresponding particle contamination. In this case, the computing unit 2*a* can output a warning or error message, for example.

As described, in particular with regard to the figures, the improved concept makes it possible to determine functional limitations of a laser scanner, in particular due to contamination of light sources or optical detectors of the laser scanner, with greater reliability and/or robustness with respect to temperature fluctuations. To this end, the invariance of the characteristic sum of pulse widths is exploited.

The invention claimed is:

1. A method for checking the function of a laser scanner, which a housing with a light-transmissive window, a transmitter unit for emitting laser signals which is arranged within the housing, a movable deflection unit for deflecting the laser signals, and a detector unit arranged within the housing, the method comprising:

- transmitting at least one test signal by the transmitter unit during a test phase;
- aligning the deflection unit vis-à-vis the transmitter unit during the test phase so that the at least one test signal is not directed at the window;
- recording components of the at least one test signal by at least two optical detectors of the detector unit and at least two detector signals are generated on the basis of the detected components;
- determining a pulse width by a computing unit for each of the at least two detector signals and a sum of the determined pulse widths is calculated; and
- checking a functionality of the transmitter unit and/or detector unit on the basis of the sum.

2. The method as claimed in claim 1, further comprising: comparing the sum with a given reference value by the computing unit; and checking the functionality of the transmitter unit and/or detector unit on the basis of a result of the comparison.

3. The method as claimed in claim 1, wherein, the at least two optical detectors each contain a photodiode operated in the reverse direction, and a reverse voltage for operating the photodiodes is controlled during the test phase in order to set a predefined detector sensitivity of the detector unit.

4. The method as claimed in claim 3, wherein all photodiodes of the at least two optical detectors are respectively operated with the same controlled reverse voltage during the test phase.

5. The method as claimed in claim 3, wherein a setpoint value for the closed-loop control of the reverse voltage is determined dependent on the detector sensitivity on the basis of given calibration data.

6. A laser scanner device having a computing unit and a laser scanner, wherein:

- the laser scanner has a housing with a light-transmissive window, a transmitter unit for emitting laser signals which is arranged within the housing, a control unit, a movable deflection unit for deflecting the laser signals, and a detector unit arranged within the housing;
- the control unit is configured to drive the transmitter unit such that the transmitter unit transmits at least one test signal during a test phase, and to drive the deflection unit in such a way that the deflection unit is aligned vis-à-vis the transmitter unit during the test phase so that the at least one test signal is not directed at the window;
  - wherein the detector unit has at least two optical detectors which are configured to record components of the at least one test signal and to generate at least two detector signals on the basis of the detected components; and
- the computing unit is configured to determine a pulse width for each of the at least two detector signals and to calculate a sum of the determined pulse widths and to check a functionality of the transmitter unit and/or detector unit on the basis of the sum.

7. The laser scanner device as claimed in claim 6, wherein the deflection unit contains a rotatable or pivotable mirror or a microelectromechanical mirror system.

8. The laser scanner device as claimed in claim 6, wherein the at least two optical detectors each contain a photodiode, the control unit is configured to operate the photodiodes in the reverse direction and to control a reverse voltage for operating the photodiodes during the test phase in order to set a predefined detector sensitivity of the detector unit.

9. The laser scanner device as claimed in claim 8, wherein the control unit is configured to operate all photodiodes of the at least two optical detectors using the same controlled reverse voltage in each case during the test phase.

10. The laser scanner device as claimed in claim 8, wherein the control unit is configured to determine a setpoint value for the closed-loop control of the reverse voltage dependent on the detector sensitivity on the basis of given calibration data.

11. A motor vehicle having a laser scanner device as claimed in claim 6.

12. A non-transitory computer-readable storage medium including a computer program having instructions which cause a laser scanner device as claimed in claim 6 to carry out a method for checking the function of the laser scanner device, comprising:

- transmitting at least one test signal by the transmitter unit during a test phase;
- aligning the deflection unit vis-à-vis the transmitter unit during the test phase so that the at least one test signal is not directed at the window;
- recording components of the at least one test signal by at least two optical detectors of the detector unit and at least two detector signals are generated on the basis of the detected components;
- determining a pulse width by a computing unit for each of the at least two detector signals and a sum of the determined pulse widths is calculated; and
- checking a functionality of the transmitter unit and/or detector unit on the basis of the sum.

* * * * *